3,382,250
AROYLALKYL DERIVATIVES OF 1,2,3,4-TETRA-
HYDRO-5H-PYRIDO[4,3b]INDOLES
Robert Phillip Johnson and John Paul Oswald, Waukegan,
Ill., assignors to Abbott Laboratories, North Chicago,
Ill., a corporation of Illinois
No Drawing. Filed Dec. 7, 1966, Ser. No. 599,747
5 Claims. (Cl. 260—296)

This invention relates to 2-aroylalkyl-1,2,3,4-tetrahydro-5H-pyrido[4,3b]indoles, their ketal derivatives, their acid-addition salts, and their use as medicinal agents.

More particularly, the invention relates to compounds of the formula

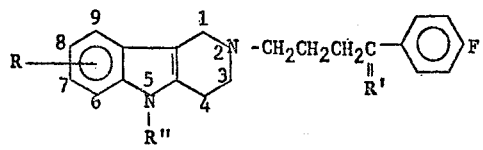

(A)

wherein R is a chloro-, bromo-, cyano-, or trifluoromethyl substituent, R' is oxygen or etylenedioxy, and R" is hydrogen or lower alkyl, and acid-additional salts thereof such as the hydrochloride, hydrobromide, and sulfate salts.

The compounds of this invention exhibit pharmacological activity, primarily through effects on the central nervous system of mammals, and are therefore useful chemotherapeutic agents. For example, the hydrochloride salt of the compound of Formula A wherein R is 8-chloro, R' is oxygen, and R" is hydrogen has been found to decrease the pain reflex in mice when administered orally or intraperitoneally at a dose of 10 milligrams per kilogram.

The compounds of the present invention are prepared by allowing the appropriate 1,2,3,4-tetrahydro-5H-pyrido-[4,3b]indole, unsubstituted in the 2-position, to react with 4 - (p - fluorophenyl)-4,4-ethylenedioxy-1-chlorobutane (the preparation of which is hereinafter described) in the presence of an acid acceptor to give the desired compound of Formula A wherein R' is ethylenedioxy. The latter may be hydrolyzed under acidic conditions to produce the corresponding compound wherein R' is oxygen. The general reaction may be depicted as follows:

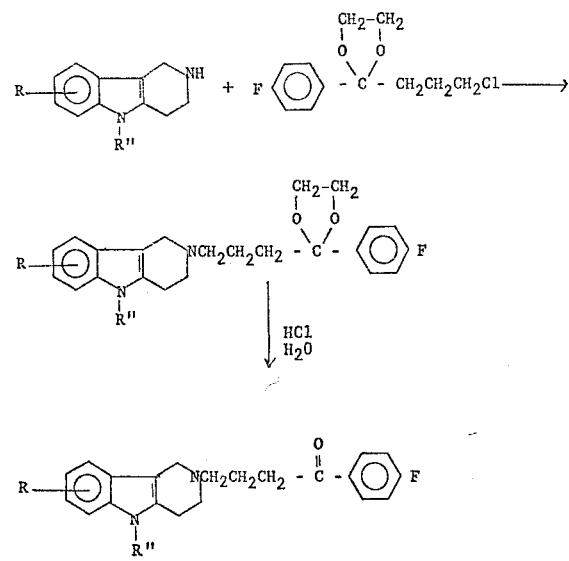

Example 1.—4-(p-fluorophenyl)-4,4-ethylenedioxy-
1-chlorobutane (starting material)

In an appropriate reaction vessel are mixed 300 g. of γ-chloro-p-fluorobutyrophenone, 20 g. of p-toluene-sulfonic acid hydrate, 130 g. of ethylene glycol, and 2.5 l. of benzene. This mixture is heated (stirring is optional) under reflux through an efficient water-separating device until water separation is complete (12 to 18 hours is usually sufficient). The resultant solution is cooled and washed with several portions of a 5% aqueous solution of sodium carbonate. After a final wash with saturated aqueous sodium chloride, the organic solution is dried (anhydrous magnesium sulfate is suitable), filtered, and subjected to fractional distillation under reduced pressure. The product distills at 162°–166° (15 mm.) or 144°–147° (10 mm.) with a refractive index of $n_D^{25}=1.505$. This material is sufficiently pure for use as indicated in the following examples. Further purification may be achieved by dissolving the product fraction in a volatile, water-insoluble solvent, such as diethyl ether, and washing this solution with several portions of water. The organic solution thus obtained is dried, filtered, and freed of the volatile solvent under vacuum. If desired, the product may then be redistilled for maximum purity.

Example 2.—8-chloro-1,2,3,4-tetrahydro-5H-pyrido-
[4,3b]indole hydrochloride

A mixture of 29.2 g. (0.140 mole) of 4,4-diethoxypiperidine hydrochloride [S. M. McElvain and R. E. McMahon, J. Am. Chem. Soc., 71, 901 (1949)] and 26.0 g. (0.145 mole) of p-chlorophenylhydrazine hydrochloride in 200 ml. of 2-propanol and 30 ml. of concentrated hydrochloric acid is stirred and heated under reflux for 70 minutes. The crystalline product is collected from the cooled reaction mixture and rinsed well with cold 2-propanol and with diethyl ether. Recrystallization from water-methanol-2-propanol gives the pure product, M.P. 270°–272° (dec.).

Similarly prepared is 8-bromo-1,2,3,4-tetrahydro-5H-pyrido[4,3b]indole hydrochloride, M.P. 282°–284° (dec.) and 8-cyano-1,2,3,4-tetrahydro-5H-pyrido[4,3b]-indole hydrochloride, M.P. 327°–330° (dec.).

Example 3.—8-chloro-2-[-γ-(p-fluorobenzoyl)propyl]-
1,2,3,4-tetrahydro-5H-pyrido[4,3b]indole hydrochloride A slurry of 13.0 g. of 8-chloro-1,2,3,4-tetrahydro-5H-pyrido[4,3b] indole hydrochloride (prepared by the method of Example 2), 15.9 g. of 4-(p-fluorophenyl)-4,4-ethylenedioxy-1-chlorobutane (prepared by the method of Example 1), and 13.0 g. of potassium iodide in 230 ml. of dimethylformamide is treated with 13.0 g. of anhydrous potassium carbonate. The resultant mixture is stirred at 80° C. for six hours. The cooled mixture is diluted with 900 ml. of aqueous sodium carbonate solution and extracted with several portions of methylene chloride. The organic extracts are combined, washed with water, dried, filtered, and freed of solvent. The residual oil is dissolved in hot aqueous methanol, and the solution is treated with concentrated hydrochloric acid to pH 1. The solution is heated to boiling for 45 minutes, treated with decolorizing charcoal and filtered hot. The clear filtrate is concentrated under reduced pressure to remove the methanol. The aqueous slurry remaining is layered with ether and made alkaline with excess potassium hydroxide solution. The layers are separated. The aqueous layer is washed twice with fresh ether. The ether extracts are combined, washed with water, dried, filtered, and freed of solvent. A solution of the residual oil in 2-propanol is acidified with gaseous hydrogen chloride. This mixture is freed of solvent and the residue is recrystallized by dissolving in a minimum of hot methanol, diluting with 2-propanol, and adding ether. After repeated recrystallization as above, the pure 8-chloro-2-[γ-(p-fluorobenzoyl)propyl] - 1,2,3,4 - tetrahydro - 5H - pyrido[4,3b] indole hydrochloride melts at 201°–202° with decomposition.

Also prepared in like manner is 8-cyano-2-(γ-[p-fluorobenzoyl]propyl) - 1,2,3,4 - tetrahydro - 5H - pyrido[4,3b]indole, isolated as its hydrobromide salt which is crystallized from boiling water as a fine white powder of indefinite melting point, decomposing above 200°.

Example 4.—8-bromo-2-[4-(p-fluorophenyl) - 4,4 - ethylenedioxy-1-butyl] - 1,2,3,4-tetrahydro-5H-pyrido[4,3b] indole hydrochloride To 500 ml. of dimethylformamide is added 43.5 g. of 8-bromo-1,2,3,4-tetrahydro - 5H - pyrido[4,3b]indole hydrochloride (Example 2), 42.0 g. of 4-(p-fluorophenyl)-4,4-ethylenedioxy-1-chlorobutane, 35 g. of potassium iodide, and 40.0 g. of potassium carbonate. The resultant slurry is stirred at 85° for five hours, then cooled and diluted with 1 liter of water. The mixture is extracted with several portions of methylene chloride. The combined organic solution is washed with water, dried over anhydrous magnesium sulfate, filtered, and freed of solvent under reduced pressure. The residue is dissolved in 2-propanol and neutralized with hydrogen chloride gas. Addition of ether precipitates the crude product, M.P. 216°–217.5° (dec.). Recrystallization from methanol-2-propanol-ether affords the pure 8-bromo-2-[4-(p-fluorophenyl) - 4,4 - ethylenedioxy-1-butyl]-1,2,3,4-tetrahydro-5H-pyrido[4,3b]indole hydrochloride, M.P. 218°–220° (dec.).

Example 5.—8-bromo-2-[γ-(p-fluorobenzoyl)propyl]-1,2,3,4-tetrahydro-5H-pyrido[4,3b]indole hydrochloride A solution of the ketal of Example 4 in hot aqueous methanol is acidified with concentrated hydrochloric acid (to pH 1) and boiled until most of the methanol has distilled. The solution is cooled to room temperature, treated with excess potassium hydroxide solution, and extracted with several portions of methylene chloride. The combined organic solution is washed with water, dried over magnesium sulfate, filtered, and freed of solvent under reduced pressure. The residue is dissolved in 2-propanol and neutralized with hydrogen chloride. Addition of ether and scratching precipitates the desired product in crystalline form. Recrystallization from methanol-2-propanolether gives the pure 8-bromo-2-[γ-(p-fluorobenzoyl)propyl] - 1,2,3,4 - tetrahydro - 5H - pyrido[4,3b]indole hydrochloride as a white crystalline powder, M.P. 208°–210° (dec.).

Example 6.—8-trifluoromethyl-2-benzyl-1,2,3,4-tetrahydro-5H-pyrido[4,3b]indole hydrochloride A mixture of 83 g. of p-(trifluoromethyl)phenylhydrazine hydrochloride and 81.0 g. of 1-benzyl-4-piperidone is slurried in 400 ml. of glacial acetic acid and 85 ml. of concentrated hydrochloric acid. This slurry is stirred and heated under reflux for six hours. The mixture is cooled for several hours and filtered. The crude solid product is then washed with cold acetic acid and with diethyl ether and is dried. This material is sufficiently pure for use in the preparation of other compounds. If desired, this compound may be further purified by recrystallization from aqueous methanol, M.P. 264°–267° with decomposition.

Example 7.—8-trifluoromethyl-1,2,3,4-tetrahydro-5H-pyrido[4,3b]indole

The 2-benzyl derivative of Example 6 is subjected to catalytic hydrogenolysis as described in Example 4. The crude crystalline residue is dissolved in aqueous methanol. This solution is treated with decolorizing carbon, filtered and made alkaline with aqueous potassium hydroxide. The precipitated free base of the product is collected and recrystallized from acetone-hexane, and then from 2-propanol to give the pure product base, M.P. 214°–218° with decomposition.

Example 8.—8-trifluoromethyl-2-[4-(p-fluorophenyl)-4,4-ethylenedioxy - 1 - butyl]1,2,3,4-tetrahydro-5H-pyrido-[4,3b]indole hydrochloride A solution of 12.9 g. of 8-trifluoromethyl-1,2,3,4-tetrahydro-5H-pyrido[4,3b]indole free base, M.P. 214°–218° dec. (prepared by the method of Example 7) in 230 ml. of dimethylformamide is treated with 15.9 g. of 4-(p-fluorophenyl)-4,4-ethylenedioxy-1-chlorobutane, 13.0 g. of potassium iodide, and 10 g. of anhydrous potassium carbonate. The resultant slurry is stirred at 85° for six hours. The reaction mixture is cooled, then diluted with 500 ml. of water and extracted several times with methylene chloride. The combined organic solution is washed with water, dried over magnesium sulfate, filtered, and freed of solvent under reduced pressure. The residue is dissolved in a 2-propanol-ether mixture and neutralized with anhydrous hydrogen chloride. Cooling and scratching the resultant solution precipitates the crude product. This is recrystallized from 2-propanol-ether to give pure 8-trifluoromethyl-2 - [4 - (p-fluorophenyl) - 4,4-ethylenedioxy-1-butyl]1,2,3,4-tetrahydro-5H-pyrido[4,3b]indole hydrochloride as a white crystalline powder, melting with decomposition at 189°–191°.

Example 9.—8 - trifluoromethyl - 2-[γ-(p-fluorobenzoyl)propyl] - 1,2,3,4, - tetrahydro-5H-pyrido[4,3b]indole hydrochloride The ketal of Example 8 is dissolved in hot aqueous methanol. This solution is acidified with concentrated hydrochloric acid and heated to boiling for 0.5 hour. The hot solution is treated with decolorizing carbon and filtered hot. Cooling the filtrate precipitates the crude product. This is recrystallized from 2-propanol-ether until pure 8-trifluoromethyl - 2 - [γ-(p-fluorobenzoyl)-propyl]-1,2,3,4-tetrahydro - 5H - pyrido[4,3b]indole hydrochloride is obtained, melting with decomposition at 206°–208°.

What is claimed is:

1. A compound of the formula

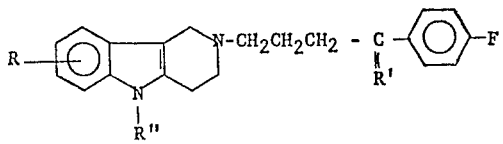

wherein R is selected from the group consisting of chlorine, bromine, and trifluoromethyl, R' is oxygen, and R" is selected from the group consisting of hydrogen and an acid-addition salt thereof.

2. A compound as claimed in claim 1 wherein R is 8-chloro, R' is oxygen, and R" is hydrogen.

3. A compound as claimed in claim 1 wherein R is 8-bromo, R' is oxygen, and R" is hydrogen.

4. A compound as claimed in claim 1 wherein R is trifluoromethyl, R' is oxygen, and R" is hydrogen.

5. A compound of the formula

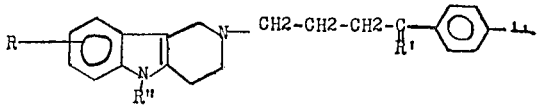

wherein R is selected from the group consisting of hydrogen, chlorine, bromine and trifluoromethyl, R' is ethylenedioxy, and R" is hydrogen.

References Cited

UNITED STATES PATENTS 2,820,040   1/1956   McLamore _____ 260—296

JOHN D. RANDOLPH, *Primary Examiner.*

A. L. ROTMAN, *Assistant Examiner.*